United States Patent [19]

Gini et al.

[11] Patent Number: 4,518,634
[45] Date of Patent: May 21, 1985

[54] METHOD AND APPARATUS FOR COATING MAGNETIC RECORDING MEDIA

[75] Inventors: Donald Gini, Boulder; Dean B. Stockton, Longmont, both of Colo.

[73] Assignee: International Business Machines Corporation, Armonk, N.Y.

[21] Appl. No.: 493,838

[22] Filed: May 12, 1983

[51] Int. Cl.³ .............................................. H01F 10/02
[52] U.S. Cl. ..................................... 427/128; 118/415
[58] Field of Search ............... 118/415; 427/128–132, 427/48

[56] References Cited

U.S. PATENT DOCUMENTS

| | | | |
|---|---|---|---|
| 2,992,627 | 7/1961 | Ring | 118/415 X |
| 3,289,241 | 12/1966 | Garrison et al. | 15/595 |
| 3,413,141 | 11/1968 | Friedman | 118/415 X |
| 3,496,909 | 2/1970 | Bennett | 118/415 X |
| 3,526,535 | 9/1970 | Plumat | 117/120 |
| 3,551,201 | 12/1970 | Marchese et al. | 117/235 |
| 3,628,503 | 12/1971 | Neuhaus | 118/415 X |
| 3,886,898 | 6/1975 | Colegrove et al. | 118/411 |
| 4,246,335 | 1/1981 | Keogh | 118/415 X |
| 4,324,816 | 4/1982 | Landis et al. | 427/128 |

Primary Examiner—Bernard D. Pianalto
Attorney, Agent, or Firm—Francis A. Sirr

[57] ABSTRACT

A coating head for use in strip-coating paper-card material with water-based, thixotropic magnetic recording ink, in order to produce disposable magnetic recording media which is intended for one write operation, followed by only a few read operations. The head sits on the card and contains a quantity of ink at ambient pressure and temperature. As the head and card move relative one another, the ink is subjected to a shear force, and a bottom surface layer of the ink is drawn into a trailing wall of the head, which wall contains a metering orifice. This orifice is of gradually increasing cross-section. That is, the orifice's entrance area is smaller than is its exit area. In this manner, the ink is subjected to a coating interface through which the ink experiences a reduction in hydrodynamic pressure, and a decrease in velocity, as the volume of the coating orifice increases. As a result, the viscosity of the ink increases as the ink progresses through the coating orifice.

11 Claims, 4 Drawing Figures

METHOD AND APPARATUS FOR COATING MAGNETIC RECORDING MEDIA

DESCRIPTION

Field of the Invention

This invention relates to the field of coating a thixotropic coating ink onto a substrate, and more specifically to coating magnetic recording ink onto paper card material, when manufacturing magnetic recording media which is intended for limited use.

Background of the Invention

A variety of coating apparatus exists in the prior art. However, no prior art device of which applicants are aware provides a coating orifice or die of increasing cross-section, such that the coating liquid is subjected to decreasing "work" thereon, as the liquid passes through the coating interface.

In U.S. Pat. No. 3,289,241 an applicator for paint, varnish or the like is shown. This applicator is an open-top, open-bottom container which is placed on a flat plate which is to be test coated. The liquid under test is poured into the top of the applicator. One wall of the applicator, adjacent the flat plate, has a series of uniform cross-section, but variably depth, notches formed therein. As the applicator is moved over the plate, with the slotted wall trailing, a coated surface of varying thickness, as defined by the slots, is left behind. This movement of the applicator, relative to the flat plate, operates to draw the mass of liquid into the slots. These slots are, however, of uniform cross-sectional area from entrance to exit.

In U.S. Pat. No. 3,526,535, a member is coated as the coating liquid free-falls, wholly or partly under the influence of gravity. The volume-rate of descent of the coating liquid, relative the displacement of the material being coated, is said to be critical to proper coating.

In U.S. Pat. No. 3,886,898 a plurality of stripes are coated onto an adjacent card. Each of the individual stripe coating stations includes an adjustable dam, which is adjustable perpendicular to the card. This dam defines the dimensions of a cavity whose lower wall is the moving card. The shape of the dam causes the dimensions of this cavity to be the inverse of the present invention; namely, the card's movement causes the liquid to be moved from a large-cross-section into a smaller-cross-section, as the liquid exists the cavity.

U.S. Pat. No. 3,551,201 provides a means for coating a stripe of magnetic recording ink onto a substrate by the use of an extrusion die. This die is of uniform cross-section from entrance to exit, and has an arcuate upper face. Movement of the substrate operates to draw coating ink into the die, whereat the die's shape forms the coated stripe's cross-section.

U.S. Pat. No. 4,324,816 teaches stripe-coating of magnetic recording material onto the side edge(s) of a web of motion picture film, by the use of a jewel die in which two cylindrical-profile bores are formed. This results in two adjacent ink beads, or columns, which tend to retain cylindrical profiles, when extruded, and which thereafter flow together to form a magnetic recording media stripe.

The Invention

The present invention provides a coating apparatus and method wherein energy is imparted to the coating liquid or ink in order to first increase the viscosity of the ink, and thereafter timewise increase its viscosity, as the ink passes through the coating interface.

More specifically, relative movement between the coating head and the substrate being coated applies a shear force to a bottom layer of a thixotropic coating ink, thereby lowering its viscosity. This lower-viscosity ink is then drawn, by this relative movement, into the opening of the head's coating orifice. In accordance with this invention, this orifice is of critical construction in that the orifice is of expending volume, and therefore decreasing hydrostatic or applied pressure and velocity, throughout the length of the orifice. The bottom planar wall of this orifice is the substrate being coated, for example, a relatively thick, paper card stock. The entrance of the orifice is of a relatively small cross-sectional area (0.0020 inch high and 0.2565 inch wide). As the ink within the orifice cavity moves toward the exit, the cross-sectional area of the orifice increases (0.0016 inch high and 0.4970 inch wide). As a result, less and less shear force, or "work" is applied to the ink as the ink passes through the orifice, and the ink's viscosity therefore increases as the ink moves through the coating orifice. The width of the coated stripe, which is a function of the width of the orifice's exit area, is accurately controlled, and the stripe does not feather, and the like, after leaving the coating head.

A preferred construction of this orifice is an arrangement which provides a short-width entrance, and a long-width exit. The long dimension of the exit is adjacent the card being coated. This long dimension therefore determines the width of the stripe being coated.

The foregoing and other objects, features and advantages of the invention will be apparent from the following more particular description of the preferred embodiment of the invention, as illustrated in the accompanying drawing.

Description of the Preferred Embodiment

Figure 1:
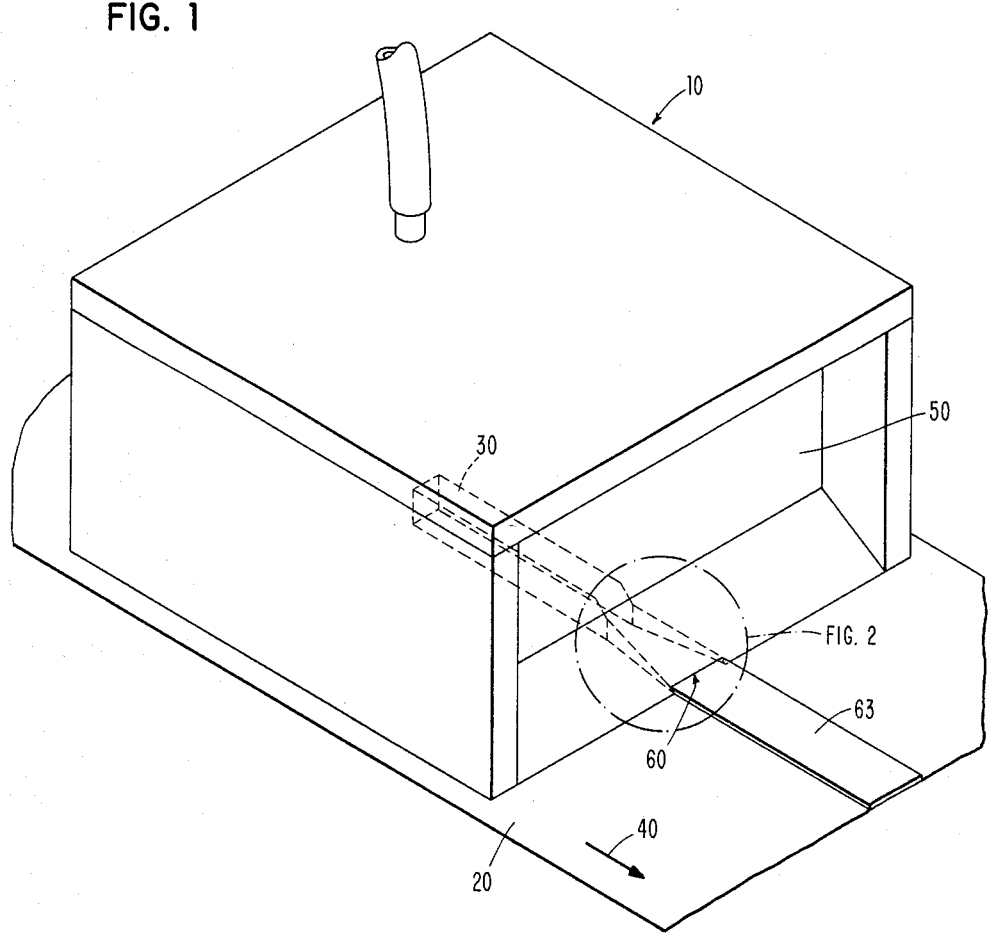
FIG. 1 shows the coating head of this invention in perspective view.

Coating head 10, which is an approximate 2 inch cube, holds a volume of coating ink 11. This ink is not under pressure. Within the box defined by the walls of the coating head, a vertical column of ink is exposed to paper card stock 20 by way of slot 30.

This slot extends parallel to the direction of paper movement, as represented by arrow 40. The slot is shown as rectangular in shape. However, its shape is not critical, and for example, it could be of a V-shape, the base of the "V" facing the head's trailing wall 50. Wall 50 is defined as the "trailing" wall since this wall is the point of departure of the ink from the head. While the exact shape of slot 30 is not critical, the presence of such a slot is required, since the presence of this moving interface between the ink and the paper is necessary so that work may be performed on the ink, lowering its viscosity, as the ink is drawn into the head's coating orifice (FIG. 2).

This work is accomplished by movement of card stock 20 under the head, i.e., relative movement between the head and the paper, which shears the ink's lower layer. As a result, the ink enters the head's coating orifice (FIG. 2's area A1, at velocity V1) at a relatively high pressure, arbitrarily defined as P1.

Figure 2:
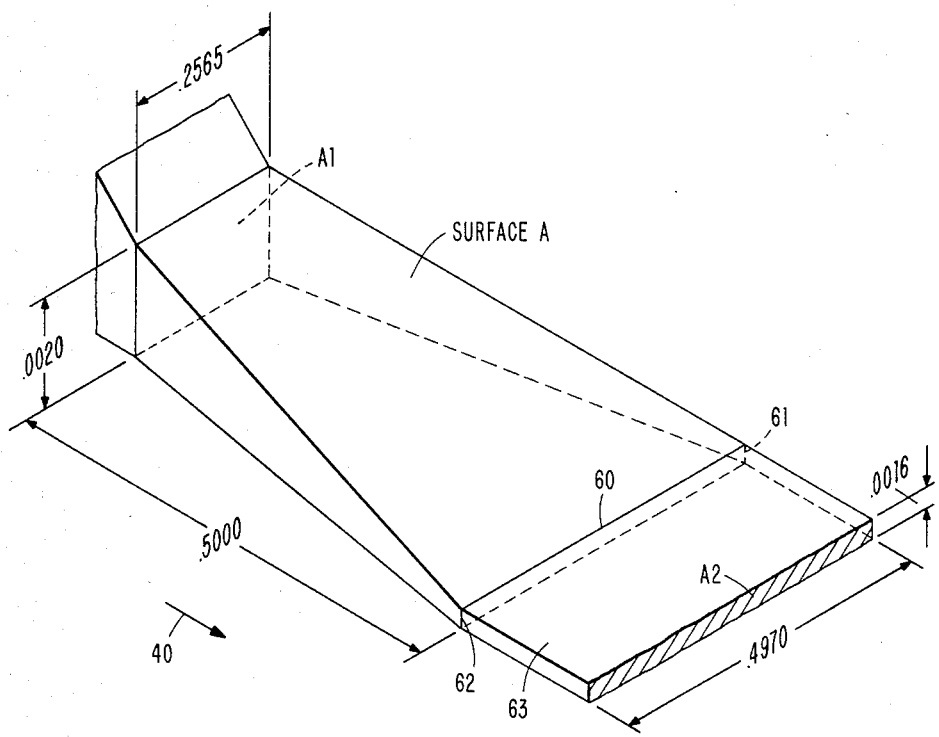
FIG. 2 shows an enlarged view of the coating cavity, as outlined by a circle in FIG. 1.

The head's vertical wall 50 establishes the shape of the coating orifice (FIG. 2). The orifice entrance is of an exemplary dimension 0.0265 inch wide by 0.0020 inch high. The orifice entrance area is defined as area A1. Wall 50 is about ½ inch thick, as measured in the direction 40 of relative movement, and therefore, the length of the coating orifice (FIG. 2) is 0.50 inch.

Figure 3:
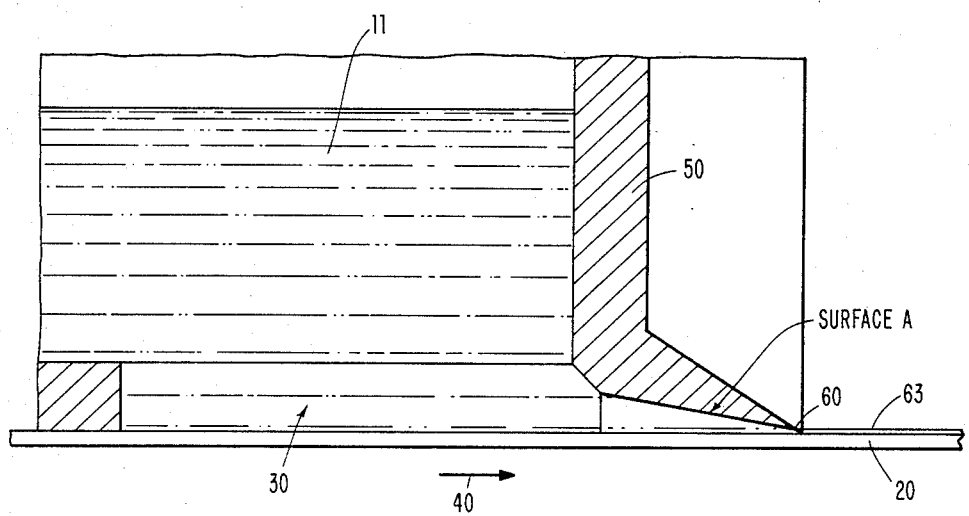
FIG. 3 is a side-section view of the coating head.

The shape of the orifice, whose lower planar wall is substrate 20 being coated, is determined by the shape of the notch (FIGS. 1 and 3) which is cut into this front wall. As seen in FIG. 2, the coating orifice, in accordance with the present invention, must be of increasing volume or cross-section when going from entrance to exit. In this particular embodiment of the invention, the width of the coating orifice linearly increases from 0.2565 inch to 0.4970 inch in a distance of ½ inch; and the height of the orifice (i.e., that dimension which is normal to card 20) linearly decreases from 0.0020 inch to 0.0016 inch, in the same distance of ½ inch. The orifice's exit area is defined as area A2. In accordance with the present invention, area A1 must be less than area A2, and as a result, entrance-area pressure P1 is greater than exit-area pressure P2, and entrance-area velocity V1 is greater than exit-area velocity V2. The preferred A1-to-A2 ratio is about 0.65. Preferably, the top surface 60, of area A2, is a knife edge. It is also desirable that orthogonal edges 61 and 62 also be relatively sharp, that is, without burrs and the like.

The effect of this unique construction and arrangement is that the viscosity of the ink is distance-controlled to produce optimum coating. More specifically, the ink's viscosity is first lowered at the location of slot 30 (FIG. 1) in order to insure adequate supply of ink to the entrance (A1) of the coating orifice, and in order to insure adequate wetting and coating of card stock 20 within the orifice. However, as the ink proceeds through the orifice, and the card stripe 63 (FIG. 2) is coated, the ink's viscosity increases, in preparation for release (A2) of the stripe from the confines of the coating orifice. In this way, low viscosity needed for good coating is achieved, as is high viscosity needed for dimensional stability of the stripe after the still-wet ink has left the coating head, and is carried away on the surface of the substrate 20.

While this invention is not to be restricted to a particular ink formulation, the following water-based ink is of particular utility when coating paper card stock of the type 99# tab card stock $CLAs_159s_251$. The coating ink is a water-based latex, containing magnetic gamma iron oxide. The latex base is WITCO W-212 (trademark of Witco Chemical Corporation). The magnetic particle is HR-350 (trademark of Hercules, Inc.). The formulation comprises 9.5 pounds of HR-350, 4.5 pounds of WITCO W-212, and 30.5 pounds of deionized water.

Figure 4:
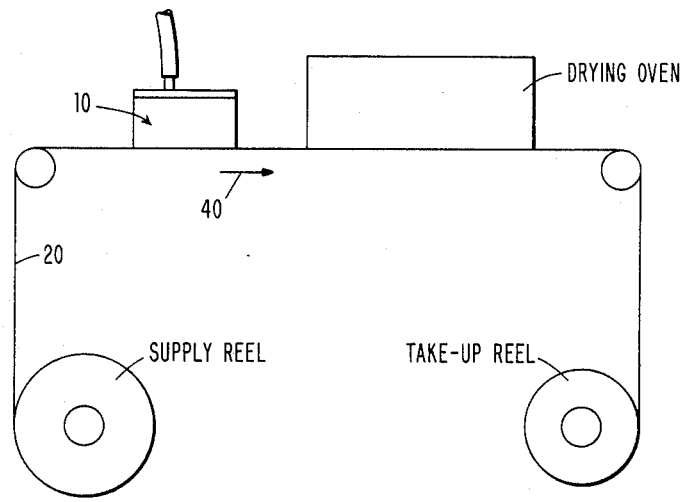
FIG. 4 shows the basic construction of a coating line using this head.

In an exemplary use of the present invention, an ink of the above formulation, and at room temperature, was placed in the coating head of FIG. 1, and the head and substrate were moved at a relative speed of 25±3 feet per minute, as shown in FIG. 4. The coated card was then oven-dried. The preferred magnitude of relative movement 40 between head 10 and paper web 20 was 25±3 feet per minute. This substrate was cut into cards and used to record magnetic flux transitions, much as is done in turnpike toll booth use. The card was thereafter successfully read, by a magnetic head, fifty times.

The visual appearance of the coated stripe did not change, when comparing a just-coated card with a card which had been allowed to dry for a period of about 0.43 minute. Both cards exhibited even, nonfeathered edges along the length of the stripe.

While the invention has been particularly shown and described with reference to a preferred embodiment thereof, it will be understood by those skilled in the art that various changes in form and details may be made therein without departing from the spirit and scope of the invention.

What is claimed is:

1. A coating head for use in coating a stripe of thixotropic liquid onto a substrate by relative movement between the head and the substrate, comprising:
   a container for holding a quantity of said liquid, said container having an opening defining a liquid-shear station whose shear force on said liquid is activated by said relative movement; and
   a confined, four-wall, expanding-volume coating orifice defined by a movement-trailing wall of said container, said orifice being aligned with said opening to receive reduced-viscosity liquid from said shear station as a result of said relative movement;
   one wall of said orifice being the substrate, and the remaining three walls of said orifice being defined by a notch which is formed in said trailing wall, said notch having a top wall opposite the substrate, and two side walls which join the top wall to the substrate, said top and side walls extending in a manner to cause the volume of said coating orifice to expand in the direction of said relative movement, thereby causing the viscosity of the liquid to increase in said direction while the liquid remains confined within said orifice.

2. The coating head of claim 1 wherein said liquid is at ambient pressure and temperature, the substrate being in a substantially horizontal plane at said coating orifice, and said coating orifice terminating in a knife edge which is substantially normal to said relative movement and spaced from but parallel to the substrate.

3. The coating head of claim 2 wherein the entrance area-to-exit area of said orifice are in a ratio of about 0.65.

4. The coating head of claim 3 wherein the entrance of said orifice is about 0.2565 inch wide and 0.0020 inch high, and wherein the exit of said orifice is about 0.4970 inch wide and 0.0016 inch high.

5. The coating head of claim 1 wherein said liquid is a water-base magnetic oxide coating ink; the substrate is paper card stock; and said coating orifice has a relatively narrow entrance, which narrow dimension runs substantially normal to the direction of said relative movement, to receive said reduced-viscosity ink from said shear station; the exit of said orifice being a relatively long slit, which narrow division also runs substantially normal to the direction of said relative movement and determines the width of the coated stripe.

6. The coating head of claim 5 wherein said orifice exit is defined by a knife edge, formed in said trailing wall, which edge runs substantially normal to the direction of said relative movement and is spaced from said substrate.

7. The coating head of claim 6 wherein said ink is at ambient pressure and temperature, said card stock defines a bottom, substantially horizontal wall of said orifice, and the notch in said trailing wall provides the remaining three, non-parallel surfaces which define the coating cavity of said orifice, the top wall of said notch sloping downward from entrance to exit, and terminating in said knife edge, and said side walls of said notch expanding outward from entrance to exit.

8. The coating head of claim 7 wherein the entrance-to-exit areas of said orifice are in a ratio of about 0.65.

9. The coating head of claim 8 wherein the thickness of the coated stripe is about 0.002 inch.

10. A method for coating a water-based, magnetic-oxide ink onto a moving paper substrate, comprising the steps of:

subjecting a stationary column of said ink to the moving substrate, to thereby shear the ink and lower its viscosity;

presenting the lowered viscosity ink to the entrance of an elongated coating orifice, one wall of which comprises the moving substrate;

expanding the volume of said orifice as the ink and substrate move through the orifice, to thereby decrease the ink's viscosity; and releasing said decreased viscosity ink from the exit of said orifice.

11. The method of claim 10 including the step of subjecting the surface of said ink opposite said substrate to a linear knife edge as provided by the exit of said orifice.

* * * * *